March 24, 1953 — W. M. SHOFFNER — 2,632,246
DOUBLE CUTTING METAL SHEARS
Filed March 31, 1949 — 4 Sheets-Sheet 1
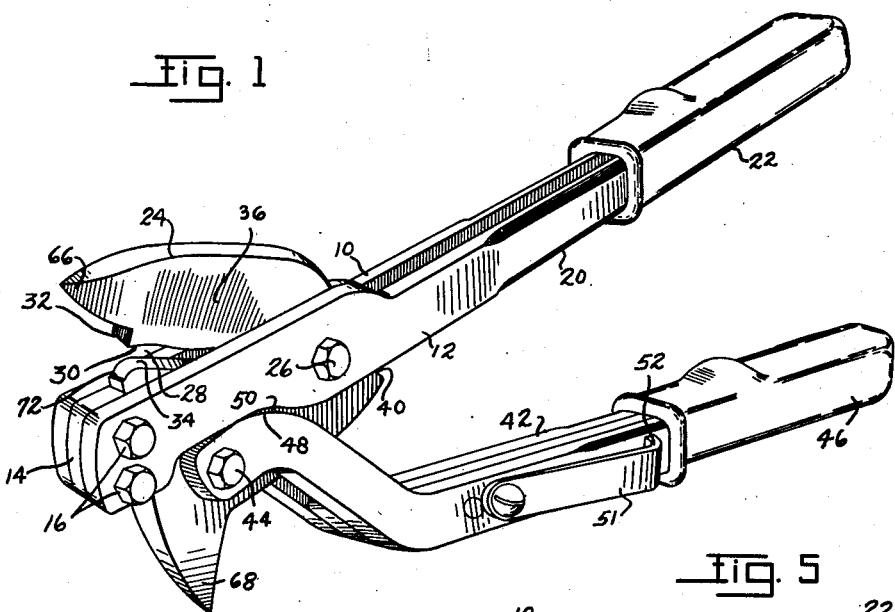
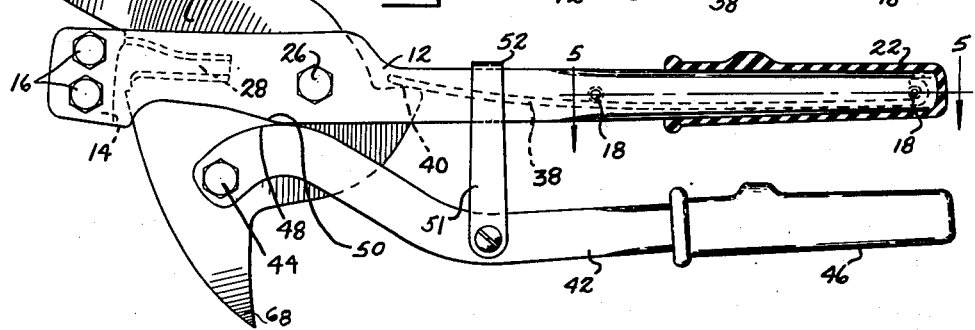
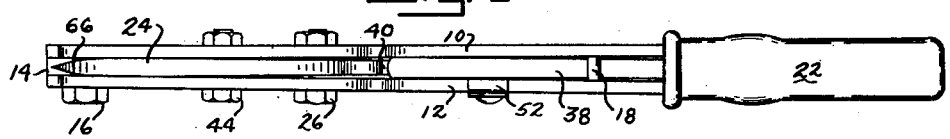
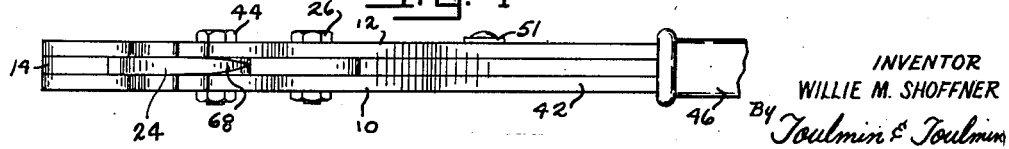
INVENTOR
WILLIE M. SHOFFNER
BY Toulmin & Toulmin
ATTORNEYS

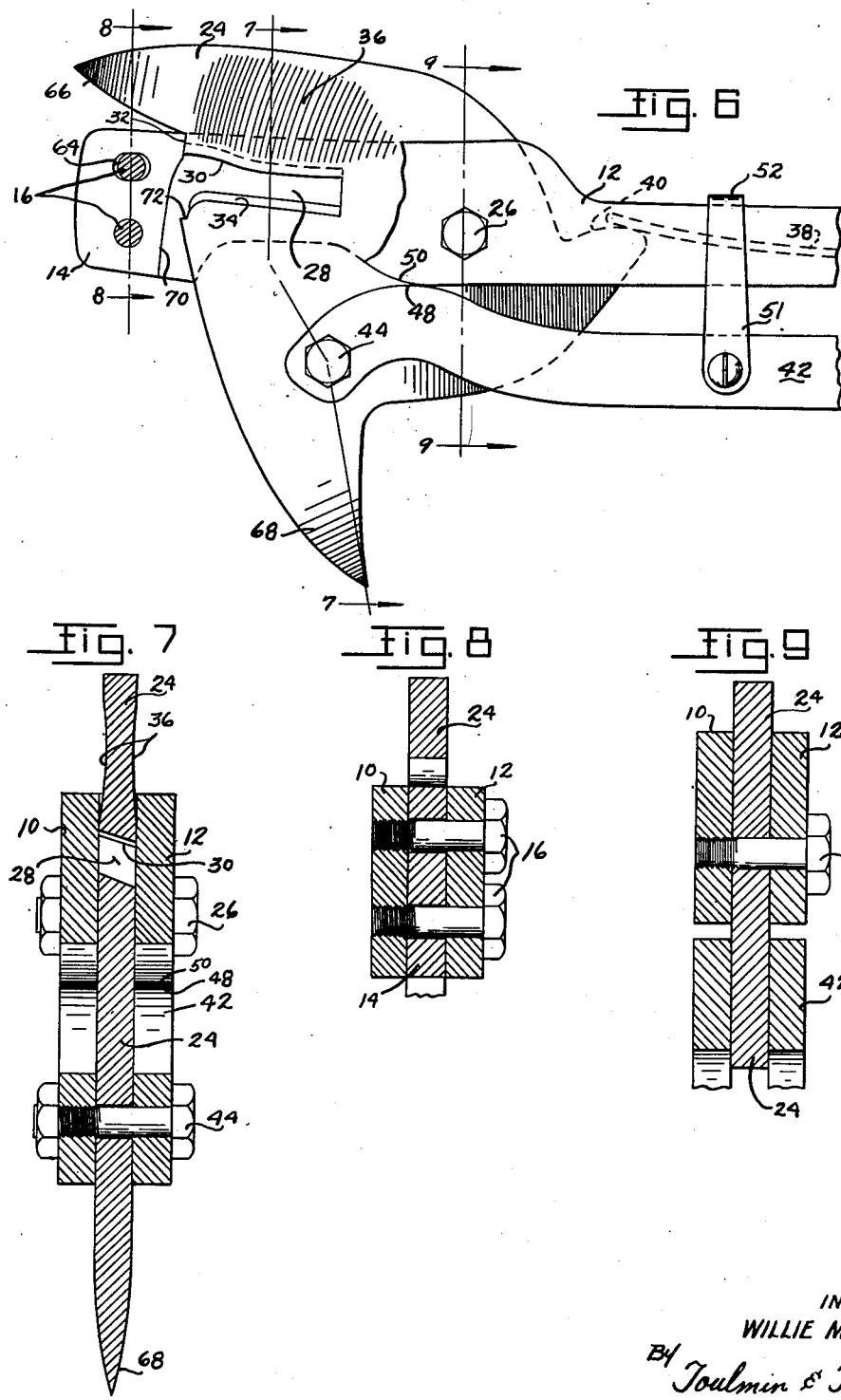

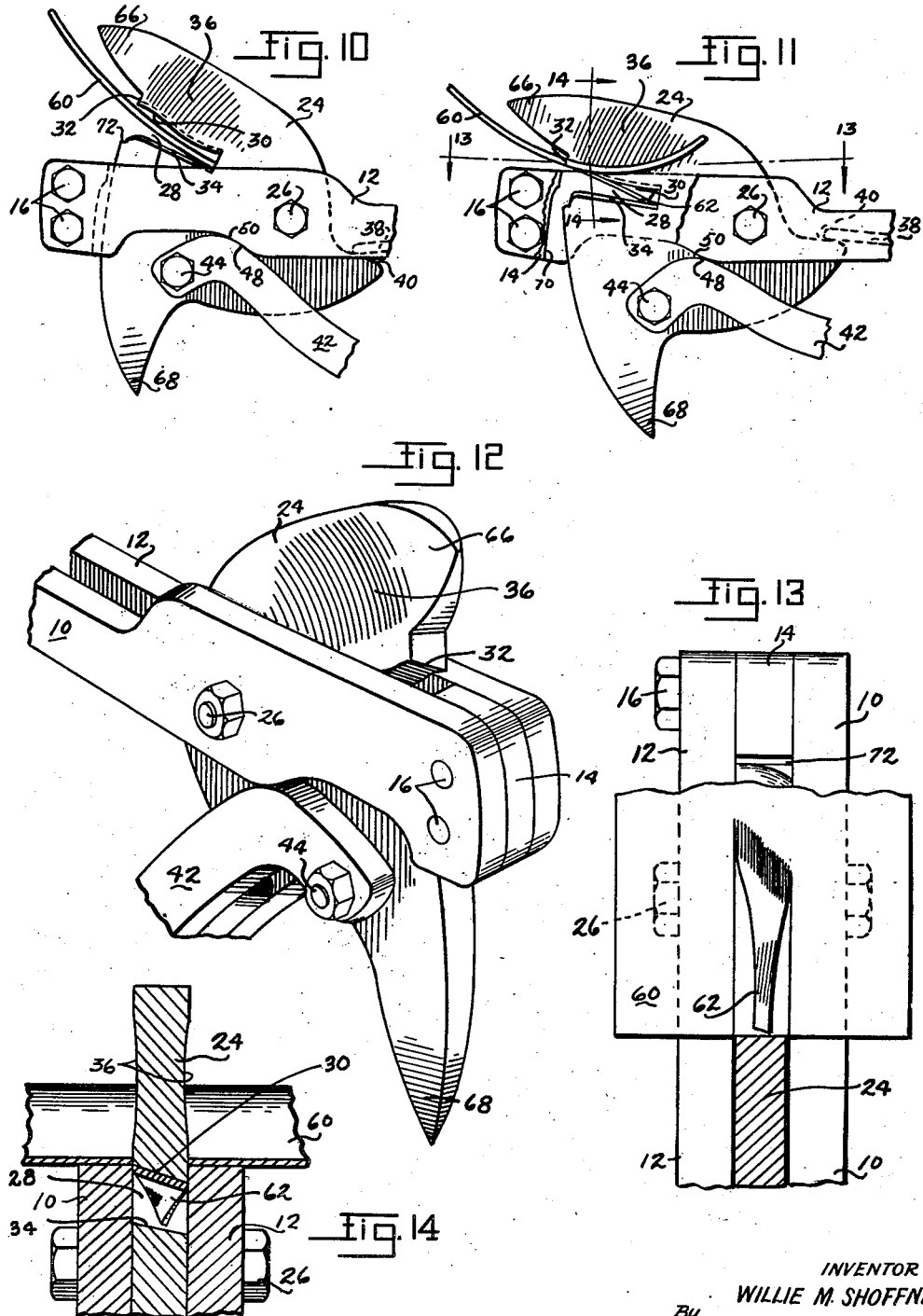

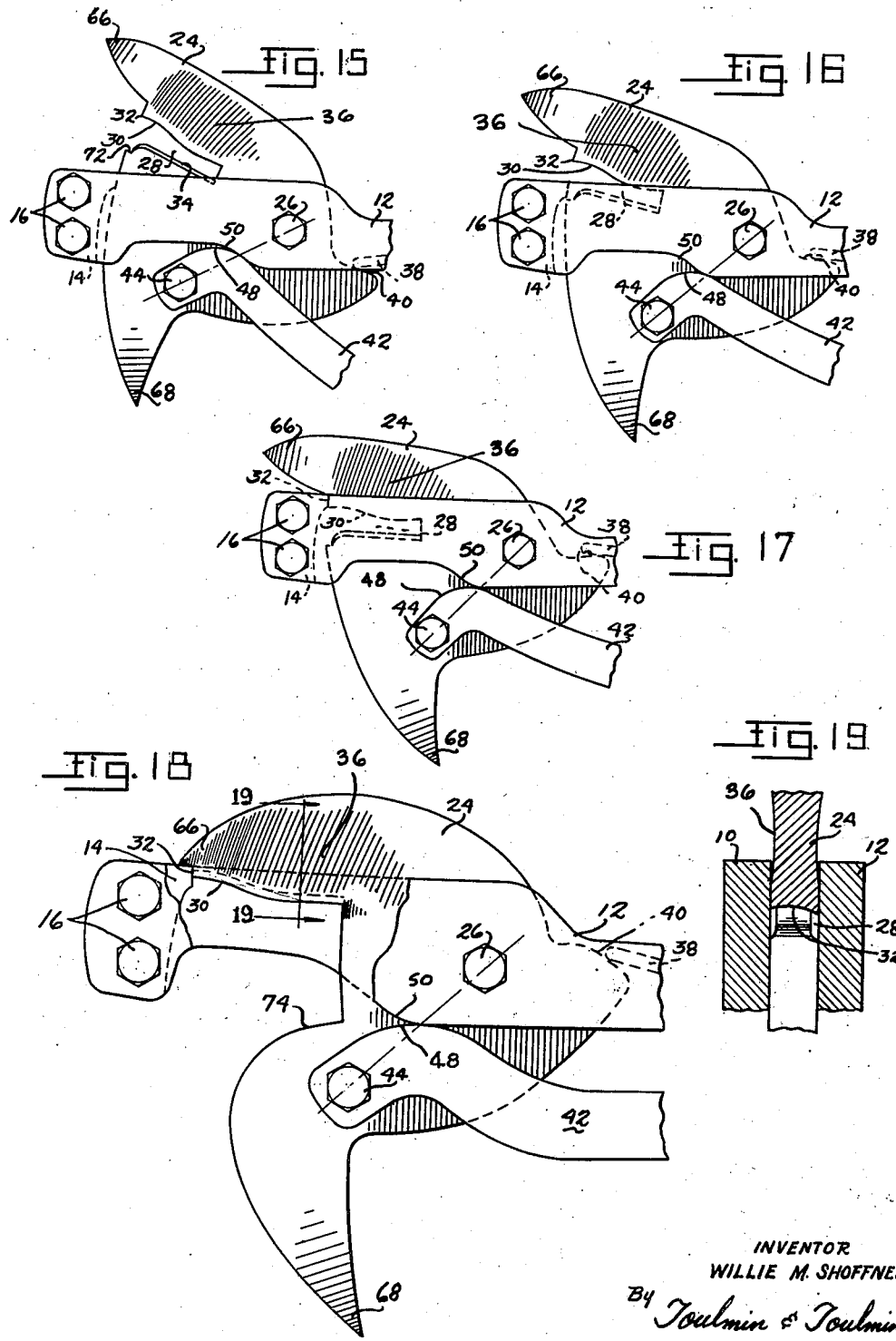

Patented Mar. 24, 1953

2,632,246

UNITED STATES PATENT OFFICE 2,632,246

DOUBLE CUTTING METAL SHEARS

Willie M. Shoffner, Dayton, Ohio

Application March 31, 1949, Serial No. 84,694

8 Claims. (Cl. 30—250)

This invention relates to metal cutting shears, and particularly to double cutting shears adapted for shearing the material to be cut along parallel lines. Metal cutting shears of the general type with which this invention is concerned are known in the art, but the ones which have heretofore been constructed have had certain inherent faults which materially detracted from their utility and ease of use.

Double cutting shears find wide use among sheet metal workers, especially for cutting around pipes and ducts. By making a double cut in the material, it is much easier to make a cut around a duct or pipe, and a much better job results.

According to the prior art, the shears merely made spaced cuts in the material such as would be obtained by making separate parallel cuts by single bladed shears. It will be evident that this manner of cutting removes the material a continuous strip of material from it. This strip of material must be disposed of as the cutting proceeds. Some shears attempt to feed this strip out from the side of the shears, and others have attempted to roll the cut out strip into a coil. None of the arrangements which have been tried have been satisfactory and double cutting shears have accordingly been of considerably less utility than is desirable.

In making a double cut through a piece of sheet metal, the load on the shearing blades is naturally increased over what it would be if only a single cut were being taken. When the material is of any considerable thickness, it becomes very difficult to cut by shears according to the prior art, due to this high cutting load. Shears according to the prior art have accordingly also lacked utility because of the great force required to operate them when the material being cut exceeded a predetermined thickness.

Most shears of both the single and double cutting type are made of castings or forgings, preferably the latter, and because of this are quite difficult to sharpen, if they have become dull. This difficulty of sharpening detracts from the useful life of the shears and also makes them much more difficult to use as the cutting edges lose their sharpness.

The primary object of the present invention is the provision of an improved construction for double cutting metal shears and the like which eliminates the foregoing difficulties which have been encountered with shears according to the prior art.

Another object is the provision of a double cutting metal shears in which the strip of material removed from the article being cut is readily disposed of and does not hinder the user of the shears.

A further object is the provision of a double cutting metal shears arrangement which can readily be resharpened whenever the cutting edges thereof become dulled through use.

It is a still further object of this invention to provide a metal cutting shears arrangement which is easy to operate at all times and which maintains its mechanical advantage throughout the cut being taken by the shears.

It is also an object of this invention to provide a metal cutting shears arrangement adapted for either manual or power operation.

Another object is the provision of a double metal cutting shears which can be employed for cutting out substantially any shaped configuration from a sheet of metal.

These and other objects are advantages which will become more apparent upon reference to the following description taken in connection with the accompanying drawings in which:

Figure 1 is a perspective view of a shears constructed according to my invention;

Figure 2 is a side view thereof;

Figure 3 is a top plan view of the shears;

Figure 4 is a bottom plan view;

Figure 5 is a plan section indicated by the line 5—5 on Figure 2 showing the construction of the shears at the handle end thereof;

Figure 6 is an enlarged view of the cutting end of the shears as it is shown in Figure 2 but with one side rail removed in order better to see the construction;

Figures 7, 8, and 9 are a vertical sectional view indicated by line 7—7 on Figure 6;

Figure 10 is a side view of the cutting end of the shears looking in the same direction as in Figures 2 and 6, but with the shears opened for receiving a sheet of metal therebetween for being cut;

Figure 11 is a view similar to Figure 10 but with the cut being taken in the material substantially completed;

Figure 12 is a perspective view of the cutting end of the shears showing the points formed on one of the shearing members for piercing ducts and conduits which are to be cut;

Figure 13 is a plan view indicated by line 13—13 on Figure 11 and showing how the strip of material which is being cut out is twisted;

Figure 14 is a transverse section indicated by line 14—14 on Figure 11 and showing the same strip as it appears from the end;

Figures 15, 16 and 17 are views of the cutting end of the shears looking in the same direction as Figure 2, but showing the shears in three different operative positions;

Figure 18 is a view similar to Figure 6 but showing a somewhat modified arrangement of the shears;

Figure 19 is a vertical section indicated by line 19—19 on Figure 18.

Referring to the drawings, and particularly to the Figures 1 through 9, the shears shown therein comprises a frame consisting of two side rails, as indicated at 10 and 12. These rails are spaced and have mounted therebetween at one end a spacer 14. Bolts or cap screws 16 retain the rails or side plates and the said spacer clamped together. The other ends of rails 10 and 12 are connected together as by the rivets 18 shown in Figures 2 and 5, and are preferably beveled, as at 20, for receiving the sleeve 22 that forms a handle means.

Fitting between rails 10 and 12 is a shearing member 24 pivoted to the said side rails as between pivot bolt 26 which is spaced longitudinally along the side rails from the spacer 14. The member 24 has a slot therein at 28 which extends from the periphery of member 24 generally toward the pivot 26. The slot 28 has its upper surface formed with a cutting edge 30 which, as will be seen in Figures 1, 2, and 6, is arcuate along its length and in a plane which is tilted relative to the axis of pivot 26. The purpose of this arrangement will become more evident hereinafter, but, in general, is for the purpose of reducing the force required to accomplish the shearing of material and for twisting the strip of material cut out by the shears.

At the outer edge of the slot there is formed cutting edge 32 extending transversely of member 24 adapted for cooperating with the upper inner edge of spacer member 14. It will be seen that the upper surface of rails 10 and 12 and spacer 14 have a continuous cutting edge extending around their inner corners and which is adapted for cooperating with the cutting edges 30 and 32 formed around the periphery of the upper wall of slot 28.

The lower wall of slot 28 is indicated at 34, and it is also tilted in the same direction as the upper wall of the slot. This tilting of the walls of the slot can best be seen in Figure 7 which is a cross-sectional view taken directly through the said slot on Figure 6.

The shearing member 24 is relieved immediately above its cutting edge, as will be seen in Figure 7 at 36. The purpose of this relief is to insure a clean cutting action and to maintain side rails 10 and 12 in engagement with the side faces of member 24 adjacent the cutting edges thereon. The relieved portions 36 of member 24 may further be availed of for augmenting the shearing action of the device by having the side rails 10 and 12 converge slightly toward spacer 14. This can be done by making the spacer 14 somewhat thinner than rivets 18 are long. Then, when member 24 is mounted between side rails 10 and 12, and pivot bolt 26 is tightened, the rails will be resiliently urged into close engagement with opposite sides of member 24 at all times. The amount of convergence of rails 10 and 12 from their handle end toward spacer 14 can be quite small, a .003 inch–.004 inch is generally sufficient.

Member 24 is adapted for being urged in a direction to expose its slot for receiving material therein to cut by a spring 38, best seen in Figure 2, and which has one end bearing on a ledge 40 formed on member 24, and its other end bent around or extending over the end rivet 18 at the handle end of the device.

Member 24 is adapted for actuation in its cutting direction by a lever 42 pivoted to the said member by the pivot bolt 44. As will be seen in Figures 1 and 4, lever 42 consists of two parts so as to extend on both sides of plate 24. This construction is of benefit in preventing lever 42 and member 24 from tilting relatively at pivot 44 when cutting loads are imposed on the said member and lever. Pivot 44 is positioned on member 24 along a line extending substantially perpendicularly from adjacent the rear end of slot 28. The thrust exerted on member 24 through pivot 44 is thus in the nature of a pulling force, and, as will be seen hereinafter, operates to improve the action of the shears.

Member 24 is also restrained from tilting relative to rails 10 and 12 by the substantial area of the member about pivot 26 which is at all times in sliding engagement with the inside surfaces of the side plates. Member 24 is thus guided and supported throughout its movement and, accordingly, has little or no tendency to twist relative to plates 10 and 12.

Lever 42 has at its right end, as viewed at 42, a handle 46 which is adapted for use in connection with the adjacent handle of the frame formed by side rails 10 and 12 for operating the shears. Adjacent the pivotal connection of lever 42 with member 24, the said lever has an arcuate cam part 48 that bears on the cam parts 50 of side rails 10 and 12. The bearing together of said cam parts provides a floating fulcrum for lever 42 which shifts as member 24 is moved.

As will be seen, this operates to maintain the mechanical advantage of lever 42 over member 24 so as a cut being taken between the shears proceeds, the power required for accomplishing the cut will remain substantially constant.

Inasmuch as spring 38 acts on member 24 in a direction which would normally urge lever 42 away from side rails 10 and 12, there may be provided a latch member 51 pivoted to member 42 and having an end part 52 adapted for hooking over side rail 12. The shears by this means may be retained in their closed position, as shown in Figure 2, for storing or carrying, and in which position the cutting edges on the side rails and spacer and on member 24 are protected from accidental damage.

The action of the above-described actuating lever arrangement for member 24 will best be seen on reference to Figures 10, 11, and 15 through 17. In these views it will be seen that a substantially constant leverage obtains during the cutting of material so that no more power is required as the cut approaches completion as was required when the cut was commenced. This is, of course, a distinct advantage, and a definite improvement over shears according to the prior art in which the amount of force required for operating the shears increased as the cut being taken proceeded.

With further reference to Figures 15 through 17 which show the shears in three operative positions, it will be noted that the point of abutment of lever 42 on the frame of the shears floats in such a manner that this point is always substantially on a line joining the pivot axes on member 24 as defined by pivots 26 and 44. The cam surfaces 48 and 50 on lever 42 and the frame of the shears respectively, thus provide for a rolling action of the lever 42 about the frame of the shears. This is materially advantageous in eliminating any loss of power at this point of the mechanism and contributes to the ease of operation of the device in addition to eliminating wear and promoting long life.

As mentioned before, the sides of slot 28 are formed so as to be skewed relative to the axis of pivot 26. Since pivot 26 is parallel with top surfaces of rails 10 and 12 and spacer 14, it follows that the sides of slot 28 are also skewed relative to the cutting edge along the said side plates and spacer. This arrangement is effective for accomplishing one of the objects of this invention, as will be seen in Figures 10, 11, 13 and 14. Due to the fact that the cutting edges on opposite sides of member 24 are in different transverse planes, the strip cut from the work piece being operated is twisted along its length as the cut proceeds. In Figures 10 and 11, the work piece being cut is indicated at 60, and the strip being cut therefrom at 62.

The twisting of the said strip is best seen in Figures 13 and 14. Due to the twist which extends from one end of the strip to the other, the said strip has its transverse dimension effectively shortened, and it falls loosely between the said side rails 10 and 12 after it is completely severed from the work piece being cut. Due to the lower wall 34 of slot 28 being also tilted, the strip remains tilted between side rails 10 and 12. Thus, after member 24 has been actuated for cutting out a strip from the work piece being cut, a retraction of member 24 to its open position will eject the cut off strip from between the side rails 10 and 12, and the said ejection will take place without the strip becoming caught or jammed between the said side rails.

It will be evident that it is essential that the two parallel cuts made in the material by the side edges of member 24 and the inner corners of rails 10 and 12 must be connected at their ends by a transverse cut in order completely to sever the cut out strip from the work piece. It has previously been pointed out that this transverse cut is accomplished by the cooperation of the cutting edge 32 at the end of slot 28 and the inner edge of spacer 14. In order to insure the correct alignment of these edges for properly making the transverse cut, the said spacer is preferably adjustable toward and away from the periphery of member 24 as by means of slot 64 therein through which the upper clamping bolt or screw 16 extends. The spacer 14 is illustrated in Figure 6 in position to cooperate with the end of the cutting blade so as to form a transverse cut between the two parallel cuts made by the cutting edges 30. However, the spacer 14 may be moved leftwardly due to the slot 64 therein where it will not be in position to cooperate with the cutting member and, hence, there will be no transverse cut between the parallel cuts made by the cutting edges 30 and the slug will remain attached to the metal sheet or other member being cut.

It has also been pointed out that a shears constructed according to my invention is particularly useful for cutting around ducts, pipes, and other closed sheet metal structures. To this end it is desirable that the tool include means for starting the cut so the shearing member thereof can be inserted through the wall of the structure for the initial cut. The means provided for this according to my invention comprises an upper point 66 on member 24 which is sharpened, as will best be seen in Figures 1, 3, and 12.

This point can readily be driven through the wall of the work piece to be cut and manipulated to form an opening of a size for receiving the end of member 24. A second point 68 may also be provided on the lower part of member 24, and this is also sharpened, as will be seen in Figures 4 and 12. This point has the same purpose as point 66 and is merely for the purpose of forming an access opening in material to be cut for receiving member 24.

In addition to the use of the device as previously described, it can also be used for cutting out special configurations from a sheet of material. This can be accomplished by moving the shears laterally of the material so the strips cut therefrom are in a side-by-side relationship rather than end-to-end.

It will be apparent in connection with this use of the shears that the arrangement for severing the strip on each cut is of importance. It will also be evident that the strips so cut from the material need not extend the full width of the shears, but may be narrow strips cut by only one of the cutting edges, if desired.

It will also be observed that the strips cut out need not be the full length of slot 28, but may be as short as necessary in order to define the proper shape to be cut from the work piece. A sheet of material can thus be nibbled out by the shears of this invention, and any size or shape of aperture formed therein.

During the nibbling out process, if the pieces of material cut out are small enough, they may fall through the bottom of the shears through the opening provided by the relieved part 70 on the inner wall of spacer 14 below the cutting edge thereof. During a nibbling operation of this type and, in fact, for all shearing operations, point 66 provides a stop for member 24 by engaging the top of spacer 14. The stop may be otherwise provided, but it is desirable that there be such a stop for preventing the lever 42 from collapsing against handle means 22 when the shears break through the work piece being cut with the result of possible injury to the operator of the shears.

With further reference to the said nibbling out process, the short pieces or slugs of material cut out at this time are not of sufficient length to be twisted as are the longer strips as shown in Figures 13 and 14, and thus many times become lodged between the side rails 10 and 12. When this occurs, the small strips, slugs, or burrs are readily ejected from between the side plates by a ledge or lip provided at 72 adjacent the outer peripheral part of member 24 and on the side of slot 28 opposite the cutting edge thereof. It has been found that the provision of this ledge is of considerable importance when the shears are used for nibbling out material as described above.

A somewhat modified construction of the shears is illustrated in Figure 18. The principal difference between the arrangement shown in Figure 18 and that shown in the previous figures is that the member 24 has a large opening 74 therein immediately adjacent its cutting edge so that the pieces cut out by member 24 can fall freely through the bottom of the frame of the shears. It will also be evident that whether the shears are constructed as shown in Figure 18 or as in Figure 6 is largely a matter of individual preference.

In connection with both the forms of shears illustrated, a definite advantage obtains in that they can be constructed substantially entirely from bar stock or plate. This makes the manufacturing of them convenient and considerably less expensive than if it were attempted to construct the device of forgings, as has been the case with prior art shears. Also, due to the fact that the members which are directly operative for shearing the material being cut are formed of substantially flat bars or plates, the shears can readily be sharpened at any time merely by grinding a small amount therefrom or by honing them with a suitable stone. This feature is, of course, of definite advantage in maintaining the shears in good operating condition and in prolonging their useful life.

In connection with the shears of my invention, the location of the connection of the actuating lever for the movable shearing member relative to its cutting edge is such that the greater part of the load that is usually imposed on the supporting pivots for the blades of the shears is removed therefrom. Thus, whereas in prior art shears the pivot connecting the blades had a tendency to wear rapidly and to detract from the operating efficiency of the shears, in the instant invention, the pivot has long life and is free of wear for an indefinitely long period, because it is only very lightly loaded at any time.

While the shears have been shown in every case with the movable shearing member in position so that it moves downwardly toward the frame of the shears for a cutting operation, it will be evident that whether the shears occupy this position in use, or are inverted, or are held vertically, depends entirely upon the job being done. In each case, the frame of the shears is on the operator's side of the work piece being cut and the movable member will be on the other side of the work piece.

It will be understood that this invention is susceptible to modification in order to adapt it to different usages and conditions, and, accordingly, it is desired to comprehend such modifications within this invention as may fall within the scope of the appended claims.

I claim:

1. In a double cutting shears; a frame comprising side rails having a spacer clamped therebetween at one end, said rails and spacer at the said one end defining an inwardly disposed cutting edge, a member pivoted between said rails at a point spaced from said spacer and having a cutting edge thereon for cooperation with the cutting edge on said frame, a lever pivoted to said member on the side of the frame opposite the cutting edge thereon and in the region of said cutting edge for actuating said member by pulling thereon in a direction substantially opposite to the direction of the resistance offered to the member by the material being cut, and cooperating cam surfaces on said lever and frame forming a floating fulcrum for said lever.

2. In a double cutting shears; a frame comprising side rails having a spacer clamped therebetween at one end, said rails and spacer at the said one end defining an inwardly disposed cutting edge, a member pivoted between said rails at a point spaced from said spacer and having a cutting edge thereon for cooperation with the cutting edge on said frame, a lever pivoted to said member on the side of the frame opposite the cutting edge thereon and in the region of said cutting means for actuating said member by pulling thereon, and cooperating arcuate cam surfaces on said lever and frame forming a floating fulcrum for said lever, the arrangement being such that a substantially constant mechanical advantage obtains of said lever on said member, said cam surfaces being so shaped and located that the point of engagement thereof for all positions of the lever is in the region of a straight line joining the two pivot points on said member.

3. A shears comprising a frame having a handle at one end and an opening at the other end extending through the frame perpendicularly to its length, said opening having a planar cutting edge around its sides and end, a member in said frame pivoted thereto between said cutting edge and handle and having a non-planar cutting edge for cooperation with the cutting edge around said opening, and a pull-down linkage for actuating said member and connected thereto on the side of the frame opposite the cutting edge around said opening and including a handle adjacent the handle on the frame, said linkage being pivoted to said member and having a rolling engagement with said frame, the rolling engagement of said lever and frame being in the region of the pivotal connections of the member and frame and the connections of the lever with the member being in the region of the cutting edge of the member whereby the working stresses in the member, lever, and frame are principally tensional and compressional.

4. In a double cutting shears; a frame comprising a pair of spaced rails forming a handle at one end and connected together at their other ends, a spacer between the rails at said other end and said rails and spacer having a continuous cutting edge extending therealong around the inside thereof at said other end, a member between said rails also having a cutting edge thereon for cooperation with the edge on said rails and pivoted between said rails at a point generally in alignment with the cutting edge on said member, a lever having pivotal connection with said member at a point displaced from the said cutting edge thereon in a perpendicular direction, said point being forwardly of the pivotal connection of the cutting member with the frame and on the opposite side of the rails from the cutting edges thereon, and cooperating arcuate parts on said lever and rails adjacent the connection of said lever and member for acting as a fulcrum for movement of said lever to actuate said member.

5. In a double cutting shears; a frame comprising a pair of spaced rails forming a handle at one end and connected together at their other ends, a spacer between the rails at said other end and said rails and spacer having a continuous cutting edge extending therealong around the inside thereof at said other end, a member between said rails also having a cutting edge thereon for cooperation with the edge on said rails and generally in alignment with the cutting edge on said member, a lever having pivotal connection with said member at a point displaced from the said cutting edge thereon in a perpendicular direction and on the opposite side of the rails from the cutting edges thereon, cooperating arcuate parts on said lever and rails adjacent the connection of said lever and member for acting as a fulcrum for movement of said lever to actuate said member, said lever having handle means at its free end adjacent the handle on said frame, a spring between the rails of the frame having a free end adjacent said member, said member being formed with a ledge engaged by the said free end of the spring, and said spring biasing the said member in a direction to separate its cutting edge from that on said rails and spacer.

6. In a double cutting shears; a frame comprising spaced side rails, a spacer between said rails at one end, a continuous cutting edge extending along the inside of said rails at the said one end and across the inner edge of said spacer, a member pivotally mounted between said rails and having cutting edge means thereon for cooperation with the cutting edge on said rails and spacer, means for actuating said member, and means for adjustably clamping said spacer between said rails for adjustment therebetween toward and away from the end of said member between shearing and non-shearing positions.

7. In a shears having a frame comprising spaced side rails having cutting edges extending along the inside corners at one end, a spacer member movably mounted between said rails at the said one end and having a cutting edge on the inside forming a continuation of the cutting edges on the rails, a cutting member pivoted between said rails and having a slot therein opening toward the said one end with cutting edges on one side and across the end on the said one side for cooperation with the said cutting edges on said rails and the cutting edge on said spacer member, and means connected with said member on the opposite side of said frame from the said cutting edges thereon for actuating said member for cutting material in said slot, and means for adjustably but rigidly clamping said spacer member between said rails, said clamping means permitting adjustment of the spacer member between the rails lengthwise of the cutting edges thereon for selectively positioning the spacer member in or out of shearing relation with said cutting member.

8. In a shears having a frame comprising spaced side rails having cutting edges extending along the inside corners at one end, a spacer member movably mounted between said rails at the said one end having a cutting edge across the inside forming a continuation of the cutting edges on the rails, a cutting member pivoted between said rails and having a slot therein opening toward the said one end with cutting edges on one side for cooperation with the said cutting edges on said rails and a cutting edge across the end for cooperation with the cutting edge on the spacer member, means connected with said member on the opposite side of said frame from the said cutting edges thereon for actuating said member for cutting material in said slot, said slot being generally skewed relative to the plane of the cutting edges on said frame, and means releasably clamping said spacer member between said rails for adjustment therebetween in the direction of the cutting edges on the rails for movement of the spacer member selectively into and out of shearing relation with said cutting member.

WILLIE M. SHOFFNER.

REFERENCES CITED

The following references are of record in the file of this patent:

UNITED STATES PATENTS

| Number | Name | Date |
| --- | --- | --- |
| 170,658 | Berridge | Dec. 7, 1875 |
| 200,548 | Larkin | Feb. 19, 1878 |
| 235,416 | Davies | Dec. 14, 1880 |
| 596,546 | Runyan | Jan. 4, 1898 |
| 646,203 | Burgess | Mar. 7, 1900 |
| 776,828 | Ernhart | Dec. 6, 1904 |
| 879,900 | Potstada | Feb. 25, 1908 |
| 955,287 | Schofield | Apr. 19, 1910 |
| 1,448,238 | Schmitz | Mar. 13, 1923 |
| 1,812,350 | Lingwood | June 30, 1931 |
| 1,908,014 | Evans et al. | May 9, 1933 |
| 2,134,609 | Hay | Oct. 25, 1938 |
| 2,163,088 | Grant | June 20, 1939 |
| 2,357,197 | Hood | Aug. 29, 1944 |

FOREIGN PATENTS

| Number | Country | Date |
| --- | --- | --- |
| 17,279 | Switzerland | Jan. 24, 1899 |
| 641,009 | France | July 26, 1928 |